United States Patent
Lin et al.

(10) Patent No.: US 10,580,231 B2
(45) Date of Patent: Mar. 3, 2020

(54) METHODS AND VEHICLES FOR HEALTH MONITORING VEHICLE SUBSTRATES AND COATINGS

(71) Applicant: GM GLOBAL TECHNOLOGY OPERATIONS LLC, Detroit, MI (US)

(72) Inventors: Wen-Chiao Lin, Rochester Hills, MI (US); Jingyan Wan, Sterling Heights, MI (US); Jian Yao, Shanghai (CN); Neeraj S. Shidore, Novi, MI (US); Qiangfeng Xiao, Troy, MI (US); Ming Yang, Novi, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 166 days.

(21) Appl. No.: 15/995,245

(22) Filed: Jun. 1, 2018

(65) Prior Publication Data

US 2019/0371090 A1    Dec. 5, 2019

(51) Int. Cl.
*G07C 5/08* (2006.01)
*G01B 7/16* (2006.01)
*G01L 5/00* (2006.01)

(52) U.S. Cl.
CPC ............. *G07C 5/0808* (2013.01); *G01B 7/18* (2013.01); *G01L 5/0052* (2013.01); *G07C 5/0816* (2013.01)

(58) Field of Classification Search
CPC ...... G07C 5/0808; G07C 5/0816; G01B 7/18; G01L 5/0052

USPC ......................................................... 701/34.4
See application file for complete search history.

(56) References Cited

U.S. PATENT DOCUMENTS

| | | | | |
|---|---|---|---|---|
| 5,245,180 A | * | 9/1993 | Sirkis | G01B 11/16 250/227.16 |
| 8,720,278 B1 | * | 5/2014 | Toivola | G01B 11/16 73/762 |
| 2006/0182160 A1 | * | 8/2006 | Watts | G02F 1/15 372/43.01 |
| 2016/0084733 A1 | * | 3/2016 | Wu | G01B 11/18 250/227.14 |
| 2018/0106140 A1 | * | 4/2018 | Barrilleaux | E21B 43/101 |

* cited by examiner

*Primary Examiner* — Yazan A Soofi
(74) *Attorney, Agent, or Firm* — Lorenz & Kopf, LLP

(57) ABSTRACT

Vehicles and methods are provided for monitoring the health of a substrate and a protective coating disposed on the substrate. A vehicle includes a substrate, a protective coating, a coating deformation sensor, and a controller. The protective coating is disposed overtop the substrate. The coating deformation sensor is operatively coupled with the protective coating and configured to measure a deformation value of the protective coating. The controller is configured to: determine a deformation recovery rate of the protective coating based on the deformation value; determine whether the deformation recovery rate corresponds with an expected recovery rate of the protective coating; and indicate that the protective coating may be impaired in response to determining that the deformation recovery rate does not correspond with the expected recovery rate.

20 Claims, 4 Drawing Sheets

METHODS AND VEHICLES FOR HEALTH MONITORING VEHICLE SUBSTRATES AND COATINGS

TECHNICAL FIELD

The present disclosure generally relates to methods and vehicles for health monitoring of vehicle substrates and coatings, and more particularly relates to vehicles and methods for monitoring impacts on the coating and measuring deformation and recovery of the coating.

INTRODUCTION

Vehicle body panels, bumpers, hoods, trunks, and similar substrates may become damaged when objects strike the vehicle. These substrates may have coatings such as paint applied over the substrate. When the substrates are covered with coatings, visual inspection to detect damage to the substrate may not be possible. Furthermore, damage to the coating itself may be detectable only by visual inspection.

Accordingly, it is desirable to provide systems, vehicles, and methods to monitor the health of substrates and coatings. Furthermore, other desirable features and characteristics of the present invention will become apparent from the subsequent detailed description and the appended claims, taken in conjunction with the accompanying drawings and the foregoing technical field and background.

SUMMARY

Vehicles and methods are provided for monitoring the health of a substrate and protective coating. In one embodiment, a vehicle includes a substrate, a protective coating, a coating deformation sensor, and a controller. The protective coating is disposed overtop the substrate. The coating deformation sensor is operatively coupled with the protective coating and configured to measure a deformation value of the protective coating. The controller is configured to: determine a deformation recovery rate of the protective coating based on the deformation value; determine whether the deformation recovery rate corresponds with an expected recovery rate of the protective coating; and indicate that the protective coating may be impaired in response to determining that the deformation recovery rate does not correspond with the expected recovery rate.

In one embodiment, the vehicle further includes an impact sensor disposed between the protective coating and the substrate. The impact sensor is configured to measure an impact force acting on the protective coating. The controller is further configured to measure the deformation recovery rate in response to detecting the impact force acting on the protective coating.

In one embodiment, the controller is further configured to determine whether the impact force acting on the protective coating is within a protection range in which the protective coating is designed to protect the substrate. The controller is further yet configured to indicate that the substrate and the protective coating may be damaged in response to determining that the impact force is not within the protection range.

In one embodiment, the controller is further configured to determine whether the impact force acting on the protective coating exceeds a predetermined threshold. The controller is further yet configured to indicate that the protective coating may be damaged in response to determining that the impact force is not less than the predetermined threshold.

In one embodiment, the controller is further configured to indicate that the substrate was not damaged by the impact force in response to determining that the impact force is less than the predetermined threshold and is within the protection range.

In one embodiment, the controller is further configured to determine whether the deformation value corresponds with the impact force acting on the protective coating. The controller is further yet configured to indicate that the substrate is not damaged in response to determining that the impact force is in the protection range and the deformation value corresponds with the impact force.

In one embodiment, the controller is further configured to indicate that the protective coating is not impaired in response to determining that the impact force is in the protection range and the deformation value corresponds with the impact force.

In one embodiment, the controller is further configured to indicate that the protective coating is degrading in response to determining that the impact force is in the protection range, the deformation value corresponds with the impact force, and the deformation recovery rate does not correspond with the expected recovery rate. In one embodiment, the controller is further configured to indicate that the substrate may be damaged in response to determining that the impact force exceeds the predetermined threshold and is in the protection range.

In one embodiment, the controller is further configured to indicate that the protective coating is damaged in response to determining that the deformation recovery rate does not correspond with the expected recovery rate, the deformation value does not correspond with the impact force, and the impact force is in the protection range.

In one embodiment, the controller is further configured to indicate that the protective coating is degrading in response to determining that the deformation recovery rate corresponds with the expected recovery rate, the impact force exceeds the predetermined threshold, the deformation value does not correspond with the impact force, and the impact force is in the protection range.

In one embodiment, the coating deformation sensor is a resistance sensor disposed between the substrate and the protective coating and is configured to measure a resistance of the protective coating. In one embodiment, the protective coating is a shear-thickening conductive material. In one embodiment, the shear-thickening conductive material includes at least one of carbon materials and metallic nanoparticles in an amount configured to permit the resistance sensor to measure the resistance of the protective coating.

In one embodiment, a vehicle includes a substrate, a protective coating, an impact sensor, a coating deformation sensor, and a controller. The protective coating is disposed overtop the substrate and is a shear-thickening conductive material including carbon materials in an amount configured to permit measuring a resistance of the protective coating. The impact sensor is disposed between the protective coating and the substrate and is configured to measure an impact force acting on the protective coating. The coating deformation sensor is operatively coupled with the protective coating and is configured to measure a deformation value of the protective coating, where the coating deformation sensor is a resistance sensor disposed between the substrate and the protective coating. The resistance sensor is configured to measure the resistance of the protective coating. The controller is configured to: determine a deformation recovery rate of the protective coating based on the deformation value and in response to detecting the impact force acting on the protective coating; determine whether the deformation recovery rate corresponds with an expected recovery rate of the protective coating; indicate that the protective coating may be impaired in response to determining that the deformation recovery rate does not correspond with the expected recovery rate; determine whether the impact force acting on the protective coating is within a protection range in which the protective coating is designed to protect the substrate; and indicate that the substrate and the protective coating may be damaged in response to determining that the impact force is not within the protection range.

In one embodiment, the controller is further configured to determine whether the impact force acting on the protective coating exceeds a predetermined threshold. The controller is further yet configured to indicate that the protective coating may be damaged in response to determining that the impact force is not less than the predetermined threshold. The controller is further yet configured to indicate that the substrate was not damaged by the impact force in response to determining that the impact force is less than the predetermined threshold and is within the protection range. The controller is further yet configured to determine whether the deformation value corresponds with the impact force acting on the protective coating. The controller is further yet configured to indicate that the substrate is not damaged in response to determining that the impact force is in the protection range and the deformation value corresponds with the impact force.

In one embodiment, the controller is further configured to indicate that the protective coating is not impaired in response to determining that the impact force is in the protection range and the deformation value corresponds with the impact force. The controller is further yet configured to indicate that the protective coating is degrading in response to determining that the impact force is in the protection range, the deformation value corresponds with the impact force, and the deformation recovery rate does not correspond with the expected recovery rate. The controller is further yet configured to indicate that the substrate may be damaged in response to determining that the impact force exceeds the predetermined threshold and is in the protection range.

In one embodiment, the controller is further configured to indicate that the protective coating is damaged in response to determining that the deformation recovery rate does not correspond with the expected recovery rate, the impact force is less than the predetermined threshold, the deformation value does not correspond with the impact force, and the impact force is in the protection range. The controller is further yet configured to indicate that the protective coating is degrading in response to determining that the deformation recovery rate corresponds with the expected recovery rate, the impact force exceeds the predetermined threshold, the deformation value does not correspond with the impact force, and the impact force is in the protection range.

In one embodiment, a method for monitoring health of a vehicle substrate and a protective coating on the vehicle substrate is provided. The method includes: determining a deformation value of the protective coating based on a resistance of the protective coating measured with a resistance sensor; measuring an impact force acting on the protective coating with an impact sensor disposed between the protective coating and the vehicle substrate; determining a deformation recovery rate of the protective coating based on the deformation value in response to detecting the impact force acting on the protective coating; determining whether the deformation recovery rate corresponds with an expected recovery rate of the protective coating; indicating that the protective coating may be impaired in response to determining that the deformation recovery rate does not correspond with the expected recovery rate; determining whether the impact force acting on the protective coating is within a protection range in which the protective coating is designed to protect the vehicle substrate; and indicating that the vehicle substrate and the protective coating may be damaged in response to determining that the impact force is not within the protection range.

In one embodiment, the method further includes: determining whether the impact force acting on the protective coating exceeds a predetermined threshold; indicating that the protective coating may be damaged in response to determining that the impact force is not less than the predetermined threshold; indicating that the vehicle substrate was not damaged by the impact force in response to determining that the impact force is less than the predetermined threshold and is within the protection range; determining whether the deformation value corresponds with the impact force acting on the protective coating; indicating that the vehicle substrate is not damaged in response to determining that the impact force is in the protection range and the deformation value corresponds with the impact force; indicating that the protective coating is not impaired in response to determining that the impact force is in the protection range and the deformation value corresponds with the impact force; indicating that the protective coating is degrading in response to determining that the impact force is in the protection range, the deformation value corresponds with the impact force, and the deformation recovery rate does not correspond with the expected recovery rate; indicating that the vehicle substrate may be damaged in response to determining that the impact force exceeds the predetermined threshold and is in the protection range; indicating that the protective coating is damaged in response to determining that the deformation recovery rate does not correspond with the expected recovery rate, the impact force is less than the predetermined threshold, the deformation value does not correspond with the impact force, and the impact force is in the protection range; and indicating that the protective coating is degrading in response to determining that the deformation recovery rate corresponds with the expected recovery rate, the impact force exceeds the predetermined threshold, the deformation value does not correspond with the impact force, and the impact force is in the protection range.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
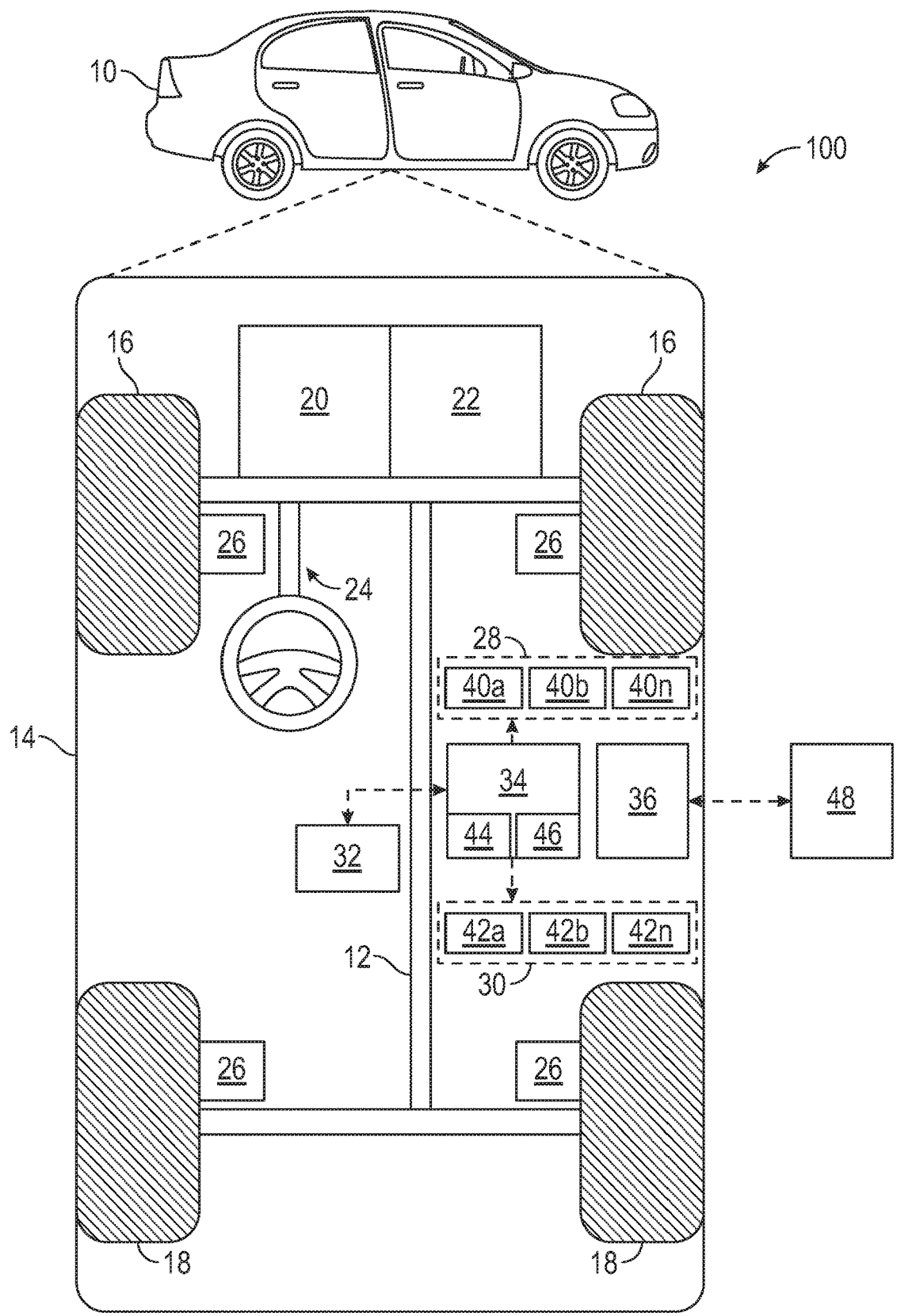
FIG. 1 is a simplified block diagram illustrating a control system for a vehicle, in accordance with various embodiments.

The following detailed description is merely exemplary in nature and is not intended to limit the application and uses.

Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Some portions of the disclosure relate to methods of forming a coat-based sensing system by composition of conductive materials with shear-thickening materials and sensor installation. Some portions of the disclosure relate to a method to apply this sensing system to provide shear thickening and protected substance health information to equipment service personnel, engineering, and customers. The shear-thickening material or other surface protection material (e.g., rubber) may be implemented as a coat-based sensing system with self-healing properties. For example, a force sensor may be installed and the material may be composited with conductive materials (e.g., carbon, metallic nanoparticles).

The methods disclosed herein may be implemented on-board the vehicle or off-board at a central processing facility. Providing early notifications for protected substance health may enhance customer experience by early notification of health degradation of protection material, may reduce minor damages that may occur to new vehicles while transporting from plant to dealership, and may improve product quality.

Although the embodiments provided refer to automobiles, the disclosure may be used for measuring long-term fatigue, vibration, overload, or other impairment of building structures or general protected surfaces. For example, the systems and method disclosed herein may be used for health assessment of building structures in earthquake areas or health assessment of protected vehicle body surfaces (e.g., body panels, bumpers). In some embodiments, the disclosure may be applied to other industries that desire surface protection, such as for aerospace, construction, heavy duty trucks, and household appliances.

With reference to FIG. 1, a control system shown generally at 100 is associated with a vehicle 10 in accordance with various embodiments. In general, control system 100 monitors the health of vehicle 10 to provide indications of when a substrate or a protective coating of vehicle 10 may be impaired.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication media and that cooperate to process the sensor signals, perform logic, calculations, methods, and/or algorithms, and generate control signals to automatically control features of the vehicle 10. In various embodiments, one or more instructions of the controller 34, when executed by the processor 44, perform tasks of the method described below.

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
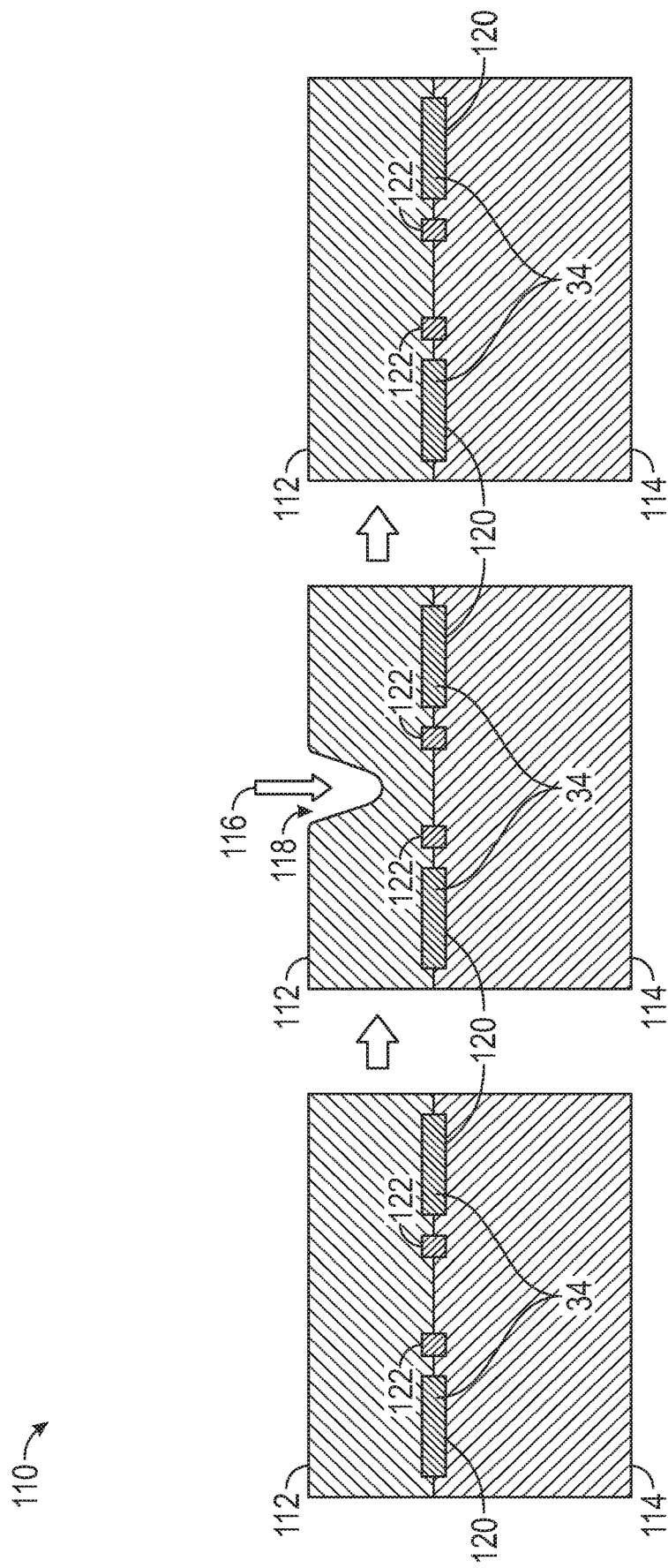
FIG. 2 is a section view illustrating a health monitoring system of the vehicle of FIG. 1, in accordance with various embodiments.
Figure 3:
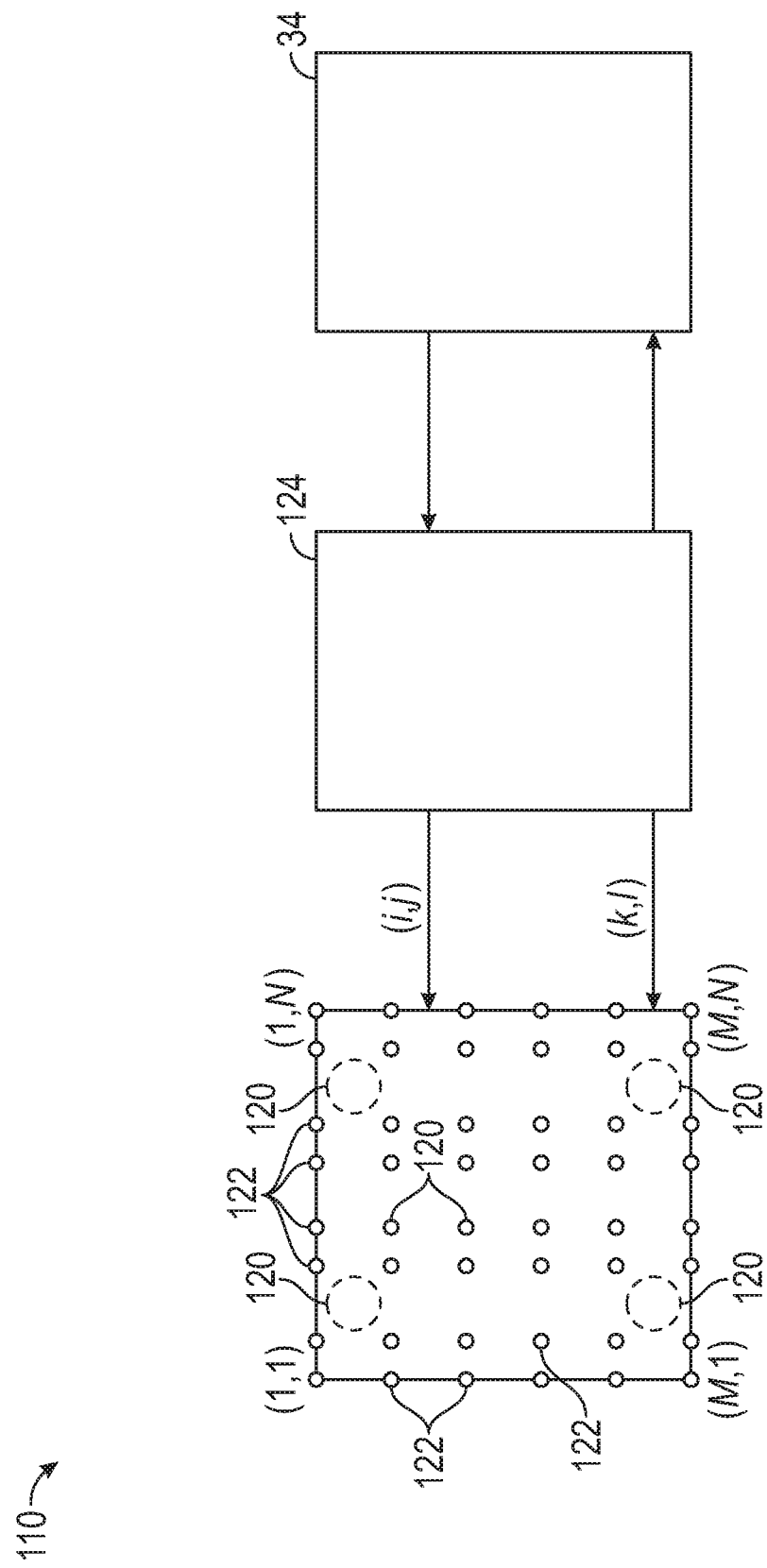
FIG. 3 is a top view illustrating the health monitoring system of FIG. 2, in accordance with various embodiments.

Referring now to FIGS. 2 and 3, and with continuing reference to FIG. 1, a health monitoring system 110 for a protective coating 112 on a substrate 114 is illustrated in accordance with some embodiments. In some embodiments, health monitoring system 110 measures an impact force 116 on and resulting deformation 118 of protective coating 112.

In the example provided, substrate 114 is an exterior panel of body 14. For example, substrate 114 may be a door panel, trunk lid, hood, body panel, bumper, or other exterior body surface. In some embodiments, substrate 114 may be an interior component such as a dashboard, piece of trim, or the like. In some embodiments, substrate 114 is a component that is not a part of a vehicle.

Substrate 114 may be carbon fiber, aluminum, or any other material to be protected against damage. When paint or other coatings are applied to substrate 114, however, it may not be possible to visually inspect substrate 114 for damage due to impact, vibration, or overloading.

Protective coating 112 may be any material applied overtop substrate and configured to protect substrate 114 from damage due to an impact with another object. Protective coating 112 dissipates impact energy to reduce cracks, dents, and other damage to substrate 114. Protective coating 112 exhibits consistent recovery from deformation after an impact when protective coating 112 is not damaged or degraded. In the example provided, protective coating 112 is a conductive shear-thickening material. The shear-thickening material exhibits impact-induced stiffening to help maintain the shape of protective coating 112 and recovers through a self-healing process after removal of the impact. As used herein, the term "shear thickening material" means a material in which viscosity increases with the rate of shear strain. The shear thickening material may also be known as dilatant material. In some embodiments, protective coating 112 is a rubber material.

In the example provided, protective coating 112 includes carbon materials in an amount configured to permit a resistance sensor to measure the resistance of protective coating 112. For example, protective coating 112 may include carbon fiber or metallic nanoparticle additives. It should be appreciated that other materials may be used to make protective coating 112 electrically conductive without departing from the scope of the present disclosure.

In addition to damaging substrate 114, objects impacting vehicle 10 may impair protective coating 112 itself. As used herein, the term "impair" includes both damage and degradation. Damage refers to the immediate tearing, cracking, puncturing, abrading, or other impairment that significantly reduces the protective abilities or appearance of protective coating 112. Degradation refers to deterioration of protective coating 112 due to aging, exposure to ultraviolet light, non-damage impairment from impacts, or exposure to high temperatures. For some protective coatings 112, an impact from an object may compress or strain protective coating 112 such that deterioration of protective coating 112 may accelerate near the impact location. The method described below may be used to detect both damage and degradation, as will be discussed below.

Impact force 116 is caused by an object coming into contact with protective coating 112. For example, shopping carts, other vehicles, hail, or other objects may strike protective coating 112 to cause impact force 116.

Deformation 118 refers to any change in the shape of protective coating 112. In the example provided, deformation 118 is an indentation. Deformation 118 may have other shapes and may be caused by forces other than impact force 116. For example, deformation 118 may be caused by bending of substrate 114 due to forces acting at edges or other parts of substrate 114. In some embodiments, deformation 118 is a recoverable deformation in which protective coating 112 recovers to an initial shape. For example, the recoverable deformation may be an entirely elastic deformation or may return to the initial shape through a self-healing process.

Health monitoring system 110 includes impact sensors 120, deformation sensors 122, deformation sensor interface 124, and controller 34. Impact sensors 120 may be any sensors configured to measure impact force 116. For example, impact sensors 120 may be force or pressure sensors strategically placed at common impact locations or distributed to infer the impact location and impact force 116. In the example provided, impact sensors 120 are disposed between protective coating 112 and substrate 114 and are configured to measure impact force 116 acting on protective coating 112.

Deformation sensors 122 are operatively coupled with protective coating 112 and are configured to measure a deformation value of protective coating 112. The deformation value indicates the severity of deformation 118. In the example provided, deformation sensors 122 are resistance sensors disposed between substrate 114 and protective coating 112 and are configured to measure a resistance of protective coating 112 as the deformation value. For example, the extent of deformation 118 may be determined by controlled measurements of resistance between various locations in the shear-thickening material. A maximum deformation and location, the material recovery status, and the material recovery rate may all be calculated based on these measured resistances.

Deformation sensor interface 124 interfaces with deformation sensors 122. For example, deformation sensor interface 124 may include power electronics to apply voltages and measure current through various combinations of deformation sensors 122 to measure the resistance at various portions of protective coating 112.

Figure 4:
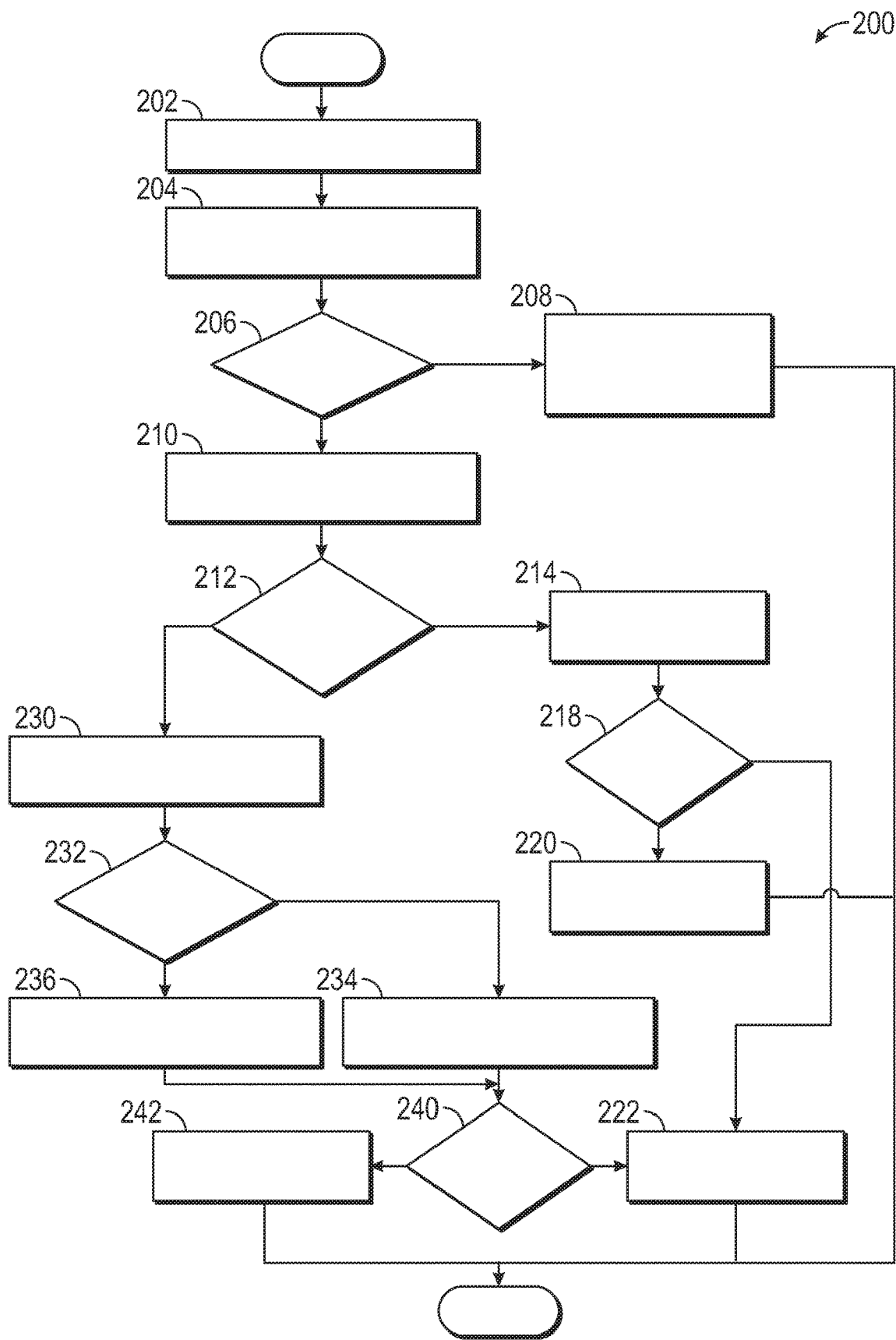
FIG. 4 is a flowchart illustrating a control method for operating the control system of the vehicle of FIG. 1, in accordance with various embodiments.

Referring now to FIG. 4, and with continued reference to FIGS. 1-3, a method 200 for monitoring the health of vehicle 10 is illustrated in flow diagram form. Task 202 receives an impact indicator. For example, controller 34 may poll impact sensors 120, proximity sensors, optical cameras, or other sensors for indications of an impact on protective coating 112. In some embodiments, the remaining tasks of method 200 are performed in response to receiving the impact indicator. In some embodiments, the remaining tasks of method 200 are performed periodically without receiving impact triggers. For example, controller 34 may monitor the health of the shear-thickening material periodically to identify any abnormal trends.

Task 204 measures an impact force and a deformation of the protective coating. For example, controller 34 may utilize impact sensors 120 and deformation sensors 122 to measure impact force 116 and the deformation value of deformation 118.

Task 206 determines whether the impact force acting on the protective coating is within a protection range in which the coating is designed to protect the substrate. For example, controller 34 may compare impact force 116 with values of forces protective coating 112 is designed to protect against. When the impact force is not in the protection range, method 200 proceeds to task 208. When the impact force is in the protection range, method 200 proceeds to task 210. Task 208 indicates that the protective coating and the substrate may be damaged in response to determining that the impact force is not within the protection range. For example, controller 34 may send alerts to a central processing facility or indicate to an owner of vehicle 10 that service for repair or replacement of substrate may be desirable. In some embodiments, the state of health of protective coating 112 and/or substrate 114 may be indicated by color coding on a display.

Task 210 measures a deformation recovery rate of the coating based on the deformation value. For example, controller 34 may calculate the speed at which deformation 118 returns to the original shape of protective coating 112 based on the deformation recovery values reported by deformation sensors 122 over time.

Task 212 determines whether the deformation value corresponds with the impact force acting on the protective coating. For example, controller 34 may determine whether impact force 116 should result in the deformation value measured by deformation sensors 122 based on known characteristics of protective coating 112. The specific relationship between the deformation values and impact force 116 will vary by implementation and composition of protective coating 112.

When the deformation value does not correspond with the impact force, method 200 proceeds to task 230, as discussed below. When the deformation does correspond with the impact force, method 200 proceeds to task 214. Task 214 indicates that the substrate is not damaged in response to determining that the impact force is in the protection range and the deformation value corresponds with the impact force. For example, controller 34 may display a graphic showing that a body panel is not cracked where impact force 116 occurred.

Task 218 determines whether the deformation recovery rate corresponds with an expected recovery rate of the protective coating. For example, controller 34 may compare the deformation recovery rate calculated in task 210 to a known recovery rate for protective coating 112. When the deformation recovery rate does correspond with an expected recovery rate, method 200 proceeds to task 220. Task 220 indicates that the protective coating is not degraded in response to determining that the impact force is in the protection range and the deformation recovery rate corresponds with the expected recovery rate. For example, controller 34 may indicate in a graphic or in a log file that coating is within a predetermined range of the original performance to indicate that protective coating 112 is not degrading.

When the deformation recovery rate does not correspond with the expected recovery rate, method 200 proceeds to task 222. Task 222 indicates that the coating may be impaired in response to determining that the deformation recovery rate does not correspond with the expected recovery rate. In the example provided, controller 34 indicates that protective coating 112 is degraded in response to determining that impact force 116 is in the protection range, the deformation value corresponds with impact force 116, and the recovery rate does not correspond with the expected recovery rate.

Task 230 compares the impact force with a predetermined threshold impact force. The predetermined threshold indicates the severity of impact force 116 that may cause permanent impairment to protective coating 112. Task 232 determines whether the impact force acting on the protective coating is less than the predetermined threshold. When the impact force is less than the predetermined threshold, method 200 proceeds to task 234. Task 234 indicates that the substrate was not damaged by the impact force in response to determining that the impact force is less than the predetermined threshold and is within the protection range. For example, controller 34 may perform task 234 when impact force 116 is not large enough to likely cause damage to substrate 114.

When the impact force is greater than the predetermined threshold, method 200 proceeds to task 236. Task 236 indicates that the substrate may be damaged in response to determining that the impact force exceeds the threshold and is in the protection range. For example, controller 34 may indicate that substrate 114 is damaged in task 236.

Task 240 determines whether the deformation recovery rate corresponds with the expected recovery rate of the protective coating as indicated above in task 218. When the deformation recovery rate does correspond with the expected recovery rate, method 200 proceeds to task 222 as described above. In the embodiment provided, controller 34 indicates that the protective coating is degrading in response to determining that the recovery rate corresponds with the expected recovery rate, deformation 118 does not correspond with impact force 116, and impact force 116 is in the protection range.

Task 242 indicates that the protective coating may be impaired in response to determining that the impact force exceeds the predetermined threshold. In the example provided, controller 34 indicates that protective coating 112 is damaged in response to determining that the recovery rate does not correspond with the expected recovery rate, deformation 118 does not correspond with impact force 116, and impact force 116 is in the protection range.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle comprising:
    a substrate;
    a protective coating disposed overtop the substrate;
    a coating deformation sensor operatively coupled with the protective coating and configured to measure a deformation value of the protective coating; and
    a controller configured to:
        determine a deformation recovery rate of the protective coating based on the deformation value;
        determine whether the deformation recovery rate corresponds with an expected recovery rate of the protective coating; and
        indicate that the protective coating may be impaired in response to determining that the deformation recovery rate does not correspond with the expected recovery rate.

2. The vehicle of claim 1, further comprising an impact sensor disposed between the protective coating and the substrate and configured to measure an impact force acting on the protective coating, and wherein the controller is further configured to measure the deformation recovery rate in response to detecting the impact force acting on the protective coating.

3. The vehicle of claim 2, wherein the controller is further configured to:
    determine whether the impact force acting on the protective coating is within a protection range in which the protective coating is designed to protect the substrate; and
    indicate that the substrate and the protective coating may be damaged in response to determining that the impact force is not within the protection range.

4. The vehicle of claim 3, wherein the controller is further configured to:
    determine whether the impact force acting on the protective coating exceeds a predetermined threshold; and
    indicate that the protective coating may be damaged in response to determining that the impact force is not less than the predetermined threshold.

5. The vehicle of claim 4, wherein the controller is further configured to indicate that the substrate was not damaged by the impact force in response to determining that the impact force is less than the predetermined threshold and is within the protection range.

6. The vehicle of claim 4, wherein the controller is further configured to:
    determine whether the deformation value corresponds with the impact force acting on the protective coating; and
    indicate that the substrate is not damaged in response to determining that the impact force is in the protection range and the deformation value corresponds with the impact force.

7. The vehicle of claim 6, wherein the controller is further configured to indicate that the protective coating is not impaired in response to determining that the impact force is in the protection range and the deformation value corresponds with the impact force.

8. The vehicle of claim 6, wherein the controller is further configured to indicate that the protective coating is degrading in response to determining that the impact force is in the protection range, the deformation value corresponds with the impact force, and the deformation recovery rate does not correspond with the expected recovery rate.

9. The vehicle of claim 6, wherein the controller is further configured to indicate that the substrate may be damaged in response to determining that the impact force exceeds the predetermined threshold and is in the protection range.

10. The vehicle of claim 6, wherein the controller is further configured to indicate that the protective coating is damaged in response to determining that the deformation recovery rate does not correspond with the expected recovery rate, the deformation value does not correspond with the impact force, and the impact force in is in the protection range.

11. The vehicle of claim 6, wherein the controller is further configured to indicate that the protective coating is degrading in response to determining that the deformation recovery rate corresponds with the expected recovery rate, the impact force exceeds the predetermined threshold, the deformation value does not correspond with the impact force, and the impact force is in the protection range.

12. The vehicle of claim 1, wherein the coating deformation sensor is a resistance sensor disposed between the substrate and the protective coating and is configured to measure a resistance of the protective coating.

13. The vehicle of claim 12, wherein the protective coating is a shear-thickening conductive material.

14. The vehicle of claim 13, wherein the shear-thickening conductive material includes at least one of carbon materials and metallic nanoparticles in an amount configured to permit the resistance sensor to measure the resistance of the protective coating.

15. A vehicle, comprising:
a substrate;
a protective coating disposed overtop the substrate, wherein the protective coating is a shear-thickening conductive material including at least one of carbon materials and metallic nanoparticles in an amount configured to permit measuring a resistance of the protective coating;
an impact sensor disposed between the protective coating and the substrate and configured to measure an impact force acting on the protective coating
a coating deformation sensor operatively coupled with the protective coating and configured to measure a deformation value of the protective coating, wherein the coating deformation sensor is a resistance sensor disposed between the substrate and the protective coating and is configured to measure the resistance of the protective coating; and
a controller configured to:
determine a deformation recovery rate of the protective coating based on the deformation value and in response to detecting the impact force acting on the protective coating;
determine whether the deformation recovery rate corresponds with an expected recovery rate of the protective coating;
indicate that the protective coating may be impaired in response to determining that the deformation recovery rate does not correspond with the expected recovery rate;
determine whether the impact force acting on the protective coating is within a protection range in which the protective coating is designed to protect the substrate; and
indicate that the substrate and the protective coating may be damaged in response to determining that the impact force is not within the protection range.

16. The vehicle of claim 15, wherein the controller is further configured to:
determine whether the impact force acting on the protective coating exceeds a predetermined threshold;
indicate that the protective coating may be damaged in response to determining that the impact force is not less than the predetermined threshold;
indicate that the substrate was not damaged by the impact force in response to determining that the impact force is less than the predetermined threshold and is within the protection range;
determine whether the deformation value corresponds with the impact force acting on the protective coating; and
indicate that the substrate is not damaged in response to determining that the impact force is in the protection range and the deformation value corresponds with the impact force.

17. The vehicle of claim 16, wherein the controller is further configured to:
indicate that the protective coating is not impaired in response to determining that the impact force is in the protection range and the deformation value corresponds with the impact force;
indicate that the protective coating is degrading in response to determining that the impact force is in the protection range, the deformation value corresponds with the impact force, and the deformation recovery rate does not correspond with the expected recovery rate; and
indicate that the substrate may be damaged in response to determining that the impact force exceeds the predetermined threshold and is in the protection range.

18. The vehicle of claim 16, wherein the controller is further configured to:
indicate that the protective coating is damaged in response to determining that the deformation recovery rate does not correspond with the expected recovery rate, the impact force is less than the predetermined threshold, the deformation value does not correspond with the impact force, and the impact force is in the protection range; and
indicate that the protective coating is degrading in response to determining that the deformation recovery rate corresponds with the expected recovery rate, the impact force exceeds the predetermined threshold, the deformation value does not correspond with the impact force, and the impact force is in the protection range.

19. A method for monitoring health of a vehicle substrate and a protective coating on the vehicle substrate, the method comprising:
determining a deformation value of the protective coating based on a resistance of the protective coating measured with a resistance sensor;
measuring an impact force acting on the protective coating with an impact sensor disposed between the protective coating and the vehicle substrate;
determining a deformation recovery rate of the protective coating based on the deformation value in response to detecting the impact force acting on the protective coating;
determining whether the deformation recovery rate corresponds with an expected recovery rate of the protective coating;
indicating that the protective coating may be impaired in response to determining that the deformation recovery rate does not correspond with the expected recovery rate;
determining whether the impact force acting on the protective coating is within a protection range in which the protective coating is designed to protect the vehicle substrate; and
indicating that the vehicle substrate and the protective coating may be damaged in response to determining that the impact force is not within the protection range.

20. The method of claim 19, further comprising:
determining whether the impact force acting on the protective coating exceeds a predetermined threshold;

indicating that the protective coating may be damaged in response to determining that the impact force is not less than the predetermined threshold;

indicating that the vehicle substrate was not damaged by the impact force in response to determining that the impact force is less than the predetermined threshold and is within the protection range;

determining whether the deformation value corresponds with the impact force acting on the protective coating;

indicating that the vehicle substrate is not damaged in response to determining that the impact force is in the protection range and the deformation value corresponds with the impact force;

indicating that the protective coating is not impaired in response to determining that the impact force is in the protection range and the deformation value corresponds with the impact force;

indicating that the protective coating is degrading in response to determining that the impact force is in the protection range, the deformation value corresponds with the impact force, and the deformation recovery rate does not correspond with the expected recovery rate;

indicating that the vehicle substrate may be damaged in response to determining that the impact force exceeds the predetermined threshold and is in the protection range;

indicating that the protective coating is damaged in response to determining that the deformation recovery rate does not correspond with the expected recovery rate, the impact force is less than the predetermined threshold, the deformation value does not correspond with the impact force, and the impact force is in the protection range; and indicating that the protective coating is degrading in response to determining that the deformation recovery rate corresponds with the expected recovery rate, the impact force exceeds the predetermined threshold, the deformation value does not correspond with the impact force, and the impact force is in the protection range.

* * * * *